United States Patent Office 3,801,576
Patented Apr. 2, 1974

3,801,576
AROYL-ETHYL-HEXAMINIUM SALTS
Wilfried Paulus, Krefeld, Brigitte Hamburger, Cologne, and Otto Pauli, Krefeld, Germany, assignors to Bayer Aktiengesellschaft, Leverkusen, Germany
No Drawing. Filed July 7, 1971, Ser. No. 160,568
Claims priority, application Germany, July 11, 1970,
P 20 34 540.8
Int. Cl. C07d 55/60
U.S. Cl. 260—248.5                    10 Claims

ABSTRACT OF THE DISCLOSURE

Microbiocidal agents containing aroyl-ethyl-ammonium salts as disclosed.

MICROBIOCIDAL AGENTS

This invention relates to microbiocidal agents which are characterized by containing aroyl-ethyl ammonium salts of Formula I $$[R_1-CO-(CH_2)_2-R_2]^+X^- \qquad (I)$$

in which $R_1$ represents an aromatic or heteroaromatic radical if desired, substituted one or more times with halogen atoms or hydroxyl or nitro or lower alkyl, alkoxy or haloalkyl groups,
$R_2$ represents a quaternary nitrogen atom which may also be a constituent of a heterocyclic ring system, and
$X$ represents an anion of an inorganic or organic acid.

Aromatic radicals $R^1$ contain up to 20 carbon atoms in the aromatic ring system. Besides the naphthyl radicals the phenyl radical has to be considered as the most important aromatic radical $R^1$. Heteroaromatic radicals $(R^1)$ are 5, 6 and 7 membered hetero ring systems which may be anellated with one or two benzene ring systems. Hetero atoms in the hetero ring are preferably sulphur, oxygen and nitrogen atoms whereby also a sulphur or oxygen atom may be combined together with one or two nitrogen atoms. The hetero aromatic radical $R^1$ may be attached to the CO-group both with the hetero ring as well as with the aromatic ring in the case where the hetero ring is anellated with a benzene ring.

As indicated above $R^2$ represents a quaternary nitrogen atom whereby in the case where the nitrogen atom is a member of a heterocyclic ring system, this heterocyclic ring system may have the same meaning as defined above for $R^1$; furthermore, in the case of $R^2$ the heterocyclic ring comprises also bi- and tricyclic hetero ring systems (e.g. tetra-aza-tricyclo-dodecan ring system, hexamethylenetetramin ring system).

Preferred anions ($X$) are halogens (especially chlorine, bromine and iodine) as well as lower alkyl sulphates (preferably $C_1$ and $C_2$). Preferred lower alkyl-, alkoxy or halo-alkyl-groups ($R^1$) are those having one to four, especially one or two carbon atoms.

According to the information given by Scott et al., (Applied Microbiology 10, 211–216 (1962)) the antimicrobial activity of quaternary hexaminium salts, which is found to be independent of the pH, is due to the gradual splitting off of formaldehyde. This invention demonstrates that these particulars given by Scott et al. have no quite general validity. The hexaminium salts according to the present invention are on an average seven times more active in comparison to formaldehyde than would correspond to their formaldehyde content (see Table I below). The activity of other known hexaminium salts, on the other hand, is never greater and in most cases less than corresponds to their formaldehyde content, as shown in Table II. The mechanism described by Scott therefore applies to these salts. The hexaminium salts according to the present invention therefore occupy a special position; this is seen particularly clearly when comparing the results in Table II with those in Table I.

The results summarized in Table I also illustrate quite generally the excellent antimicrobial activity of the substances used according to the invention. The test organisms used were slime organisms which were isolated from the circulation of spinning water used for the production of polyamide, e.g. *Aerobacter aerogenes*, *Bacillus subtilis*, *E. coli*. The germistatic minimum concentration (GMC) was determined as follows:

1% of caprolactam was added to Allen's nutrient solutions to serve as a carbon source and an additional source of nitrogen for the slime organisms, and after sterilization the test substances were added in concentrations of 0.5 to 100 mg./liter. The nutrient solutions were then infected with the above mentioned slime organisms. Nutrient solutions which contained the GMC or higher concentrations of active substance were still completely clear after 3 weeks culture at room temperature, i.e. the multiplication of microbes and production of mucus normally observed after 3 to 4 days in nutrient solutions which contain no active substance fails to take place.

TABLE I
$[R_1-CO-(CH_2)_2-R_2]^+X^-$

| $R_1$ | $R_2$ | X | GMC in mg./l. |
|---|---|---|---|
|  | —N(CH₂)₆— | Cl | 2 |
| Same as above | —Hexamethylenetetramine— | Cl | 5 |
| Do | —Tetraazatricyclododecane— | Cl | 1 |
|  | —N(CH₂)₆— | H₃CO—SO₃ | 2 |
| Same as above | —Hexamethylenetetramine— | Cl | 5 |
| Do | —Tetraazatricyclododecane— | Cl | 2 |
|  | —Hexamethylenetetramine— | Cl | 5 |
|  | ..... do ..................... | Cl | 5 |
|  | ..... do ..................... | Cl | 3 |
|  | ..... do ..................... | Cl | 5 |
|  | ..... do ..................... | Cl | 5 |
|  | —N(CH₂)₆— | Cl | 1 |
| Same as above | —Hexamethylenetetramine— | C. | 1 |
| | Formaldehyde (comparison agent) | | 15 |

TABLE I—Continued

| $R_1$ | $R_2$ | X | GMC in mg./l. |
|---|---|---|---|
| 4-Cl-phenyl | N-methylpyrrolidine | Cl | 3 |
| Same as above | pyridine | Cl | 3 |
| Do | 4,5-dimethylthiazole | Cl | 2 |
| Do | isoquinoline | Cl | 5 |
| thienyl | Hexamethylenetetramine | Cl | 2 |
| phenyl | —N(CH₃)₂—CH₂—phenyl | Cl | 5 |

TABLE II $$\left[ \begin{array}{c} N \diagdown N \diagup N-R \\ \diagdown N \diagup \end{array} \right]^{+} X^{-}$$

| R | X | GMC in mg./l. |
|---|---|---|
| —CH₂—CH=CHCl | Cl | 50–100 |
| —CH₂—CO—NH—CH₂OH | I | 50–100 |
| —CH₂—CO—NH—(4-Cl-phenyl) 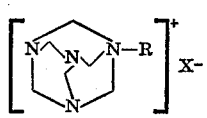 | Cl | 50 |
| —CH₂—CO—NH—CH₂OH | Cl | 50–100 |
| —CH₂—CO—Ph | Cl | 50 |
| —CH₂—CO—(4-CH₃-phenyl) | Cl | 20 |
| —CH₂—CO—(4-Cl-phenyl) | Br | 50 |
| —CH₂—CO—(4-OCH₃-phenyl) | Cl | 50 |
| —CH₂—CO—(4-NO₂-phenyl) | Cl | 75 |
| —CH₂—CO—(4-CH(CH₃)₂-phenyl) | Cl | 50 |
| —CH₂—CO—(4-OH-phenyl) | Cl | 50 |
| —CH₂—CO—thienyl | Cl | 50 |
| Formaldehyde (comparison agent) | | 15 |

The active substances used according to the invention are in general defined by the above Formula I.

In this formula, however, $R_1$ preferably represents a phenyl radical, if desired, substituted one or more times with halogen atoms or hydroxyl, nitro or $C_{1-4}$ lower alkyl, alkoxy or haloalkyl groups, or a naphthyl, thienyl, thiazolyl or pyrazolyl radical. $R_2$ preferably represents a quaternary ammonium ion which may be derived from a trialkylamine (preferably $C_{1-4}$) or from N-methylpyrrolidone or from pyridine or a thiazole or it may form part of the ring system of triethylenediamine, hexamethylenetetramine or 1,3,6,8-tetraazatricyclo[6.2.1.1³·⁶] dodecane. X has the meaning as given above (see especially column 1, line 53).

The substances may be prepared according to known methods, i.e. by the quaternization of aryl-(2-dialkylamino)-ethyl ketones with dialkylsulphates, alkyl iodides or benzylhalides or by the quaternization of the corresponding tertiary amines with aryl-(2-halogen)-ethyl ketones in acetone or chloroform.

Two such known methods suitable for preparing these compounds are the following:

Method (a)

1 mol of a dialkylsulphate or alkylhalogenide is dropped into a solution of 1 mol of aryl-(2-dialkylamino-)ethylketone dissolved in dry diethylether under stirring. Stirring is continued for a further 24 hours period and afterwards the precipitated quaternary salt is separated by filtration. The filter residue is washed with dry diethyl-ether or dry aceton and optionally purified by crystallization from dry methanol. The reaction products are generally obtained in yields lying between 50 and 100% of the theoretical.

Method (b)

To a solution of 1 mol of aryl-(2-halogen-)ethyl ketone dissolved in dry aceton a solution respectively suspension of 1 mol of a tertiary amin in dry aceton is added under stirring. It is self-evident that the reaction time can be shortened by heating under reflux. The isolation respectively purification of the reaction product is carried out as described under method a. The yields of the reaction products lie between 50 and 100% of the theoretical.

The following Tabe III shows the names of the compounds being described in Table I together with their melting points as well with their Method (a) or (b) of preparation.

TABLE III
[Names of the reaction products described in Table I]

| | Compound name | Method | Melting point, °C. |
|---|---|---|---|
| 1 | (2-benzoyl-)ethyl-trimethyl-ammonium-chloride. | b | 135 |
| 2 | N-(2-benzoyl-)ethyl-hexaminium-chloride. | b | 162 |
| 3 | N-(2-benzoyl-)ethyl-tetraazonium-tricyclododecan-chloride. | b | 80 |
| 4 | (2-p-chlorbenzoyl-)ethyl-trimethyl-ammonium-methylsulphate. | b | 136 |
| 5 | N-(2-p-chlorbenzoyl-)ethyl-hexaminium-chloride. | b | 180 |
| 6 | N-(2-chlorbenzoyl-)ethyl-tetra-azoniumtricyclododecan-chloride. | b | 76 |
| 7 | N-(2-p-methylbenzoyl-)ethyl-hexaminium-chloride. | b | 170 |
| 8 | N-(2-methoxybenzoyl-)ethyl-hexaminium-chloride. | b | 127 |
| 9 | N(2-p-nitrobenzoyl-)ethyl-hexaminium-chloride. | b | 175 |
| 10 | N-(2-p-isopropylbenzoyl-)ethyl-hexaminium-chloride. | b | 189 |
| 11 | N-(2-dichlorbenzoyl-)ethyl-hexaminium-chloride. | b | 184 |
| 12 | N-(2-naphthoyl-)ethyl-hexaminium-chloride. | b | 175 |
| 13 | (2-naphthoyl-)ethyl-trimethy-ammonium-chloride. | b | 262 |
| 14 | N-(2-p-chlorbenzoyl-)ethyl-N-methyl-pyrrolidinium-chloride. | b | 142 |
| 15 | N-(2-p-chlorbenzoyl-)ethyl-pyridinium-chloride. | b | 140 |
| 16 | N-(2-p-chlorbenzoyl-)ethyl-(4,5-dimethyl-)thiazolium-chloride. | b | 161 |
| 17 | N-(2-p-chlorbenzoyl-)ethyl-iso-chinolinium-chloride. | b | 201 |
| 18 | N-(2-thienoyl-)ethyl-hexaminium-chloride. | b | 160 |
| 19 | (2-benzoyl-)ethyl-benzyl-dimethyl-ammonium-chloride. | a | 147 |

The microbiocidal agents according to the invention destroy or prevent the propagation of numerous bacteria, e.g. *Bact. fluorescens, Bact. proteus vulgare, Bact. pyocyaneum, Bact. subtilis, Bact. coli* and *Myc. tuberculosis*, as well as moulds and yeasts such as *Penicillium glaucum, Rhizopus nigricans, Aspergillus niger, Torula utilis, Candida crusei* and *Candida albicans* and algae, e.g., *Phaedactylum tricornutum* Bohlin, *Euglena gracilis* Klebs, *Oscillatoria geminata* Meneghini, *Stichococcus bacillaris* Naegeli. Owing to their high solubility in water and low toxicity to fish (the substances are approximately 10 times less toxic to fish than pentachlorophenol) the microbiocidal agents according to the invention are excellent for combating slime organisms and algae, e.g., in the circulation systems of paper factories and cooling water circuits, as well as for preserving aqueous systems such as emulsions of soluble oils and cutting oils, disperse dyes, glues, pastes, French polishes, wax emulsions, etc. The quantities required can easily be determined by preliminary tests. The microbiocidal agents according to this invention may also be added to other known microbiocidal agents.

The activity and application of the microbiocidal agents according to the invention will be further explained by the following examples.

EXAMPLE 1

In a paper factory in which the water circulating systems and material supply channels are severly obstructed with mucus (approximately 600 million germs per ml.), N-(2-p-chlorobenzoyl - ethyl) - hexamethylenetetrammonium chloride is introduced in such an amount into the machine chest that the concentration of active substance in the chest and in the sieve water is about 25 mg./l. The mucus dissolves and after elimination of the resulting operational disturbance production returns to normal with a sharply reduced germ count. A second dose of active substance (12 mg./l.) is added 2 hours after the first; a germ count reduction of more than 99.9% is thereby achieved.

EXAMPLE 2

A conventional soluble cutting oil emulsion used for lathe tools and cutting tools, containing 0.1 to 0.15% by weight of (2-benzoyl)-ethyl-benzyl-dimethyl-ammonium chloride remains stable for months without the occurrence of disadvantageous manifestations such as unpleasant smells or breaking up of the emulsion which normally accompany microbial decomposition. In contrast, a soluble cutting oil emulsion to which the agent mentioned above has not been added shows signs of decomposition within 2 weeks.

EXAMPLE 3

0.05% by weight of (2-benzoyl-ethyl) trimethylammonium methyl sulphate is added to a wax used for the maintenance of floors. The wax emulsion treated in this way is very stable on storage and capable of destroying germs, e.g., of *Staph. aureus* and *Bact. pyocyaneum*.

What it claimed is:

1. Aroyl-ethyl-hexaminium salts having the formula

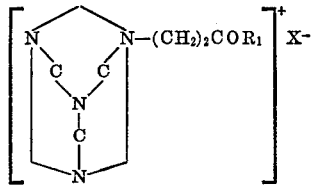

wherein X is halogen or lower alkyl sulfate anion; and $R_1$ is selected from the group consisting of phenyl, naphthyl, the foregoing substituted by halogen, hydroxyl, nitro, lower alkyl, lower alkoxy, and lower haloalkyl, and

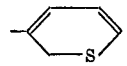

2. Compound of claim 1 wherein said salt N-(2-benzoyl)-ethyl-hexaminium-chloride.
3. Compound of claim 1 wherein said salt N-(2-p-chlorobenzoyl-)ethyl-hexaminium-chloride.
4. Compound of claim 1 wherein said salt N-(2-p-methyl-benzoyl)-ethyl-hexaminium-chloride.
5. Compound of claim 1 wherein said salt-(2-p-methoxybenzoyl-)ethyl-hexaminium-chloride.
6. Compound of claim 1 wherein said salt N-(2-p-nitrobenzoyl-)ethyl-hexaminium-chloride.
7. Compound of claim 1 wherein said salt N-(2-p-isopropylbenzoyl-)ethyl-hexaminium-chloride.
8. Compound of claim 1 wherein said salt N(2-dichlorobenzoyl-)ethyl-hexaminium-chloride.
9. Compound of claim 1 wherein said salt N-(2-naphthoyl-)ethyl-hexaminium-chloride.
10. Compound of claim 1 wherein said salt N-(2-thienoyl-)ethyl-hexaminium-chloride.

References Cited

UNITED STATES PATENTS

| | | | |
|---|---|---|---|
| 2,714,111 | 7/1955 | Hermann | 260—248.5 |
| 2,744,111 | 5/1956 | Gregory | 260—248.5 |
| 3,624,253 | 11/1971 | Pawloski | 260—248.5 |

JOHN M. FORD, Primary Examiner

U.S. Cl. X.R.

424—249; 71—67; 260—567.6 M, 326.8, 290 HL, 302 R, 286 R

UNITED STATES PATENT OFFICE
CERTIFICATE OF CORRECTION

Patent No. 3,801,576  Dated April 2, 1974

Inventor(s) Wilfried Paulus, et al.

It is certified that error appears in the above-identified patent and that said Letters Patent are hereby corrected as shown below:

Page 1, after the "ABSTRACT OF THE DISCLOSURE" sub-title "Microbiocidal Agents" should read --AROYL-ETHYL-HEXAMINIUM SALTS--.

Column 2, line 69 in Table I, second from last line before "Formaldehyde" "C" should read --$C_1$--.

Column 4 in Table III

- Compound 6  "2-chlorbenzoyl" should read --2-p-chlorbenzoyl--;
- Compound 8  "(2-methoxybenzoyl)" should read -- (2-p-methoxybenzol) --
- Compound 13  "trimethy" should read --trimethyl--.

IN THE CLAIMS:

Claims 2-10, line 1 of each after "salt", in each instance insert --is--.

Signed and sealed this 15th day of October 1974.

(SEAL)
Attest:

McCOY M. GIBSON JR.  C. MARSHALL DANN
Attesting Officer  Commissioner of Patents